(12) United States Patent
Xu et al.

(10) Patent No.: US 10,733,641 B2
(45) Date of Patent: Aug. 4, 2020

(54) PARKING MANAGEMENT METHOD, SERVER, USER TERMINAL AND SYSTEM

(71) Applicant: TENCENT TECHNOLOGY (SHENZHEN) COMPANY LIMITED, Shenzhen (CN)

(72) Inventors: Yanghui Xu, Shenzhen (CN); Peng Liu, Shenzhen (CN); Rong Zeng, Shenzhen (CN); Hang Zhou, Shenzhen (CN); Hao Huang, Shenzhen (CN); Junhan Tan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 459 days.

(21) Appl. No.: 15/208,857

(22) Filed: Jul. 13, 2016

(65) Prior Publication Data
US 2016/0321715 A1 Nov. 3, 2016

Related U.S. Application Data

(63) Continuation of application No. PCT/CN2015/098363, filed on Dec. 23, 2015.

(30) Foreign Application Priority Data

Dec. 30, 2014 (CN) .......................... 2014 1 0840034

(51) Int. Cl.
*G06Q 30/02* (2012.01)
*G06F 16/951* (2019.01)
(Continued)

(52) U.S. Cl.
CPC ....... *G06Q 30/0284* (2013.01); *G06F 16/951* (2019.01); *G07B 15/02* (2013.01);
(Continued)

(58) Field of Classification Search
CPC .......... G06Q 30/0284; G06Q 2240/00; H04W 88/02; H04W 4/046; H04W 48/14; G07B 15/06; G06F 17/30864
See application file for complete search history.

(56) References Cited

U.S. PATENT DOCUMENTS

2003/0112154 A1* 6/2003 Yoakum .................. G08G 1/14
340/932.2
2008/0319837 A1* 12/2008 Mitschele .............. G07B 15/02
705/13
(Continued)

FOREIGN PATENT DOCUMENTS

CN 101174345 A 5/2008
CN 102663837 A 9/2012
(Continued)

OTHER PUBLICATIONS

R. E. Barone, T. Giuffrè, S. M. Siniscalchi, M. A. Morgano and G. Tesoriere, "Architecture for parking management in smart cities," in IET Intelligent Transport Systems, vol. 8, No. 5, pp. 445-452, Aug. 2014. (Year: 2014).*

(Continued)

*Primary Examiner* — Daniel Vetter
*Assistant Examiner* — Manal A. Alsamiri
(74) *Attorney, Agent, or Firm* — Brinks Gilson & Lione

(57) ABSTRACT

A parking management method, a server, a user terminal and a system are provided. The parking management method includes: acquiring a parking service information request sent by a user terminal; acquiring parking service information of a bound vehicle of the user terminal, where the parking service information includes a transfer data volume corresponding to a parking service of the bound vehicle in a target parking lot; sending the parking service information to the user terminal to make the user terminal submit a data transfer request to a data transfer server based on the parking service information, to request the data transfer server to transfer the transfer data volume from an account of the user terminal to an account of the parking management server.

9 Claims, 9 Drawing Sheets

(51) Int. Cl.
*H04W 4/44* (2018.01)
*G07B 15/06* (2011.01)
*G07B 15/02* (2011.01)
*H04W 48/14* (2009.01)
*H04W 88/02* (2009.01)

(52) U.S. Cl.
CPC .............. *G07B 15/06* (2013.01); *H04W 4/44* (2018.02); *H04W 48/14* (2013.01); *G06Q 2240/00* (2013.01); *H04W 88/02* (2013.01)

(56) References Cited

U.S. PATENT DOCUMENTS

| | | |
|---|---|---|
| 2012/0054098 A1 | 3/2012 | Yu et al. |
| 2012/0245966 A1* | 9/2012 | Volz ...................... G06Q 10/02 705/5 |
| 2014/0214500 A1* | 7/2014 | Hudson .............. G06Q 30/0284 705/13 |

FOREIGN PATENT DOCUMENTS

| | | | | |
|---|---|---|---|---|
| CN | 102855671 A | 1/2013 | | |
| CN | 103177480 A | 6/2013 | | |
| CN | 103559807 A | 2/2014 | | |
| CN | 104036556 A | 9/2014 | | |
| CN | 104616361 A | 5/2015 | | |
| KR | 20120058281 A | * | 6/2012 | |
| KR | 20130012039 A | 1/2013 | | |
| WO | WO-2012138071 A2 | * | 10/2012 | ............. G06Q 20/32 |
| WO | WO 2014/012885 A1 | 1/2014 | | |

OTHER PUBLICATIONS

International Search Report for PCT/CN2015/098363 dated Mar. 24, 2016 (Translation included) (12 pgs).

Office Action dated Feb. 14, 2016 for Chinese Application No. 201410840034.1, 21 pages.

Office Action dated Jul. 22, 2019 for Indian Application No. 201627020999, 7 pages.

* cited by examiner vehicle to be charged: YUE B12345 charging position: Shenzhen mart admission time instant: 2014-12-12 10:03:05 parking duration: 6 hours and 58 minutes payment amount: 14.0RMB click to see a charging rule start payment

PARKING MANAGEMENT METHOD, SERVER, USER TERMINAL AND SYSTEM

CROSS REFERENCE OF RELATED APPLICATION

The present application is a continuation of International Application No. PCT/CN2015/098363, filed on Dec. 23, 2015, which claims the priority to Chinese Patent Application No. 201410840034.1, titled "PARKING MANAGEMENT METHOD, SERVER, USER TERMINAL AND SYSTEM", filed on Dec. 30, 2014 with the State Intellectual Property Office of People's Republic of China, both of which are incorporated herein by reference.

TECHNICAL FIELD

The present disclosure relates to the internet, and in particular to a parking management method, a server, a user terminal and a system.

BACKGROUND

Presently, a parking lot charges generally by manual timing or a radio frequency card.

In a case of charging by the manual timing and when a vehicle is to enter a parking lot, the vehicle needs to stop at an entrance of the parking lot, a staff records information of the vehicle such as a license plate number and an admission time instant on a parking card, and a driver receives the parking card. When the vehicle is to depart from the parking lot, the driver returns the parking card to the staff, the staff records a departure time instant on the parking card and charges a parking fee according to a charge standard, and the driver drives out of the parking lot after paying the parking fee.

In a case of charging by the radio frequency card and when a vehicle is to enter a parking lot, a driver receives a parking card at an entrance of the parking lot; and when the driver is to drive out of the parking lot, the driver stops the vehicle to pay a charging fee by swiping the radio frequency card and then drives out of the parking lot.

No matter whether charging by the manual timing approach or the radio frequency card, the driver needs to stop to receive the parking card, and needs to return the parking card and pay the charging fee manually when driving out of the parking lot, thereby consuming time. Particularly, in a case that the vehicle enters or departs from the parking lot at peak periods, it will result in congestion in the parking lot.

SUMMARY

A technical issue to be addressed in embodiments of the present disclosure is to provide a parking management method, a server, a user terminal and a system, which can achieve the management of parking by a communication application and greatly improve an efficiency of the management of parking.

In order to address the above technical issue, according to a first aspect of embodiments of the present disclosure, a parking management method is provided, which includes:

acquiring a parking service information request sent by a user terminal;

acquiring parking service information of a bound vehicle of the user terminal, where the parking service information includes a transfer data volume corresponding to a parking service of the bound vehicle in a target parking lot; and sending the parking service information to the user terminal to make the user terminal submit a data transfer request to a data transfer server according to the parking service information, to request the data transfer server to transfer the transfer data volume from an account of the user terminal to an account of the parking management server.

Accordingly, according to a second aspect of the embodiments of the present disclosure, a parking management method is further provided, which includes:

sending, by a user terminal, a parking service information request to a parking management server of a target parking lot to make the parking management server acquire parking service information of a bound vehicle of the user terminal, where the parking service information includes a transfer data volume corresponding to a parking service of the bound vehicle in the target parking lot;

receiving, by the user terminal, parking service information sent by the parking management server; and submitting, by the user terminal, a data transfer request to a data transfer server based on the parking service information, to request the data transfer server to transfer the transfer data volume from an account of the user terminal to an account of the parking management server.

Accordingly, according to a third aspect of the embodiments of the present disclosure, a parking management server is further provided, which includes one or more processors and a storage medium storing operation instructions, where in a case that the operation instructions in the storage medium are run, the processors are configured to:

acquire a parking service information request sent by a user terminal;

acquire parking service information of a bound vehicle of the user terminal, where the parking service information includes a transfer data volume corresponding to a parking service of the bound vehicle in a target parking lot; and send the parking service information to the user terminal to make the user terminal submit a data transfer request to a data transfer server based on the parking service information, to request the data transfer server to transfer the transfer data volume from an account of the user terminal to an account of the parking management server.

Accordingly, according to a fourth aspect of the embodiments of the present disclosure, a user terminal is further provided, which includes one or more processors and a storage medium storing operation instructions, where in a case that the operation instructions in the storage medium arc run, the processors are configured to:

send a parking service information request to a parking management server of a target parking lot to make the parking management server acquires parking service information of a bound vehicle of the user terminal, where the parking service information includes a transfer data volume corresponding to a parking service of the bound vehicle in the target parking lot;

receive parking service information sent by the parking management server; and submit a data transfer request to a data transfer server based on the parking service information, to request the data transfer server to transfer the transfer data volume from an account of the user terminal to an account of the parking management server.

The parking management server in the embodiments of the present disclosure may send the parking service information to the user terminal bound to the vehicle, such that the user can send the data transfer request for a parking service based on the parking service information by the user terminal, thereby greatly improving an efficiency of the parking management and greatly reducing time and energy consumed of the user on the parking service.

BRIEF DESCRIPTION OF THE DRAWINGS

In order to illustrate technical solutions in embodiments of the present disclosure more clearly, hereinafter drawings to be used in the description of the embodiments or the conventional technology are introduced. The drawings described below are only some of the embodiments of the present disclosure. Those skilled in the art may obtain other drawings based on these drawings without any creative work.

FIG. 6 is a schematic diagram of parking service information according to an embodiment of the present disclosure;

DETAILED DESCRIPTION

Hereinafter technical solutions of embodiments of the present disclosure are described clearly and completely in conjunction with drawings of the embodiments of the present disclosure. The described embodiments are only some rather all of the embodiments of the present disclosure. Any other embodiments obtained based on the embodiments of the present disclosure by those skilled in the art without any creative work fall within the scope of protection of the present claims.

A parking management server mentioned in the embodiments of the present disclosure may be a backend server for monitoring and managing a target parking lot, which may communicate with a user terminal over the internet. For example, a communication identifier of the backend server is registered with a communication server in advance, and the backend server may communicate with the user terminal by using the communication identifier via the communication server. The communication server may be an immediate communication server or an SNS (social networking services) server. In an optional embodiment, a communication identifier registered for the parking management server may be a communication public service number. In addition, a user terminal mentioned in the embodiments of the present disclosure may be a personal computer, a mobile phone, a smart phone, a tablet computer, an e-reader, a notebook computer, a vehicle terminal or a wearable portable device, or the like, which may communicate with the parking management server over the internet. A data transfer server mentioned in the embodiments of the present disclosure may be a data transfer processing server, for example a payment server, such as a third party payment server or a bank payment server, or the like. In an optional embodiment, the data transfer server may be integrated into an immediate communication server or an SNS server supporting a payment service function, which is not limited in the embodiments of the present disclosure.

It should be noted that, in the embodiments of the present disclosure, the user terminal and the parking management server may communicate with each other via the communication server. For example, in a case that the user terminal is to send a parking service information request to the parking management server, the user terminal may submit a parking service information request carrying the communication identifier of the parking management server to the parking management server, such that the communication server pushes the parking service information request to the parking management server.

Figure 1:
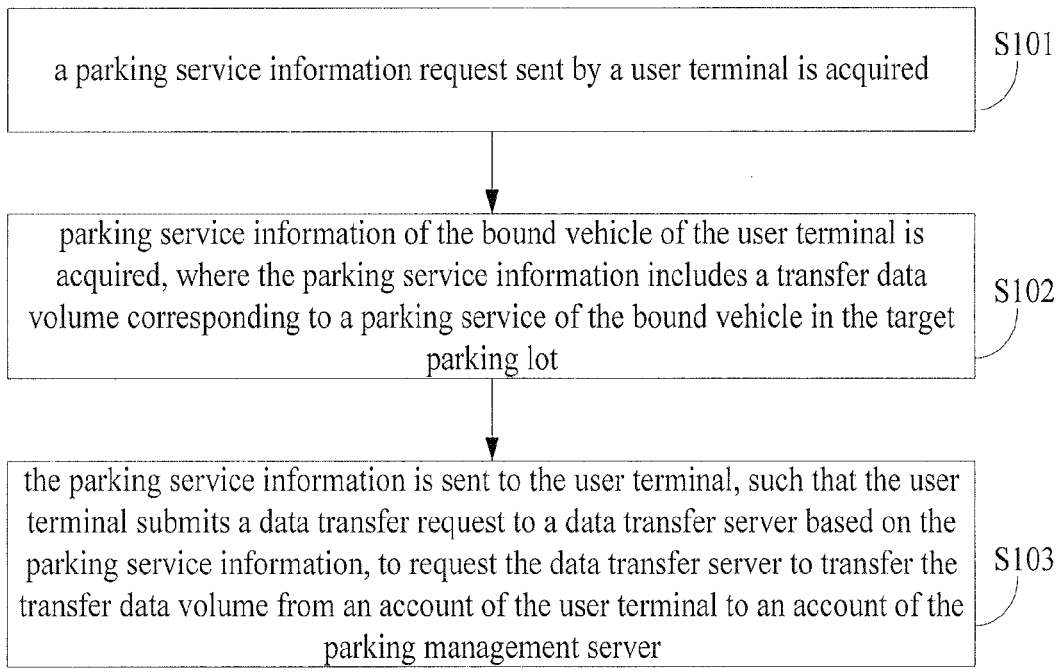
FIG. 1 is a schematic flowchart of a parking management method according to an embodiment of the present disclosure.

FIG. 1 is a schematic flowchart of a parking management method according to an embodiment of the present disclosure, and it is described mainly from a parking management server side. As shown in FIG. 1, the flow of the parking management method according to the embodiment may include step S101 to step S103 in the following.

In step S101, a parking service information request sent by a user terminal is acquired.

In a specific implementation, the user terminal may send the parking service information request to a parking management server of a target parking lot by scanning a two dimensional code of a parking service of the target parking lot, or send the parking service information request to a communication public service number corresponding to the parking management server of the target parking lot. The parking service request may carry a communication identifier of the user terminal and/or a vehicle identifier of a bound vehicle of the user terminal. For example, the user terminal may register a vehicle identifier bound to the communication identifier of the user terminal with a communication server in advance, thereby sending a parking service information request carrying the vehicle identifier bound to the communication identifier.

In step S102, parking service information of the bound vehicle of the user terminal is acquired, where the parking service information includes a transfer data volume corresponding to a parking service of the bound vehicle in the target parking lot.

In a specific implementation, in a case that the bound vehicle enters the target parking lot, the parking management server may receive vehicle admission information sent by a vehicle detection device arranged at an entrance of the target parking lot. The vehicle admission information includes a vehicle identifier of the bound vehicle (for example a license plate number) arriving at the entrance of the target parking lot and an admission time instant when the bound vehicle passes through the entrance of the target parking lot, which are obtained via a license plate automatic recognition by a vehicle detection device arranged at the entrance of the target parking lot. The parking management service generates, maintains and manages parking service information of the bound vehicle based on the admission time instant when the bound vehicle passes through the entrance of the target parking lot. If a driver of the vehicle registers a communication identifier of a bound user terminal in advance, a parking service record, a vehicle identifier and the communication identifier may be managed in an association manner. In practice, the parking service record of the vehicle may be acquired based on the vehicle identifier or the bound communication identifier, and current parking service information of the vehicle is acquired based on the current parking service record. The parking service information may include a vehicle identifier of the vehicle, identifier information of the target parking lot, a parking time instant and a transfer data volume corresponding to a parking service of the bound vehicle in the target parking lot and so on.

In an optional embodiment, the parking management server may acquire the vehicle identifier of the bound vehicle of the user terminal carried in the parking service information request, inquire a parking service record of the bound vehicle of the user terminal based on the vehicle identifier, and generate parking service information of the bound vehicle of the user terminal based on the parking service record. In another embodiment, the parking management server may acquire, based on a communication identifier of the user terminal carried in the parking service information, a vehicle identifier bound to the communication identifier of the user terminal. For example, the parking management server requests to acquire the vehicle identifier bound to the communication identifier of the user terminal from the communication server, inquires a parking service record of the bound vehicle of the user terminal based on the vehicle identifier, and generates parking service information of the bound vehicle of the user terminal based on the parking service record.

In step S103, the parking service information is sent to the user terminal, such that the user terminal submits a data transfer request to a data transfer server based on the parking service information, to request the data transfer server to transfer the transfer data volume from an account of the user terminal to an account of the parking management server.

FIG. 6 is a schematic diagram showing a display effect of parking service information received by a user terminal, which is sent by a parking management server. At the bottom of an interface shown in FIG. 6, a key of "start payment" may be provided. A user of the user terminal may submit a data transfer request to a data transfer server by clicking the key, to request the data transfer server to transfer the transfer data volume from an account of the user terminal to an account of the parking management server, where the data transfer request may carry the transfer data volume carried in the parking service information and the communication identifier of the parking management server.

In an optional embodiment, the parking management method may further include:

receiving vehicle departure information sent by a vehicle detection device arranged at an exit of the target parking lot, where the vehicle departure information includes a vehicle identifier of the bound vehicle arriving at the exit of the target parking lot, where the vehicle identifier is obtained via a license plate automatic recognition by the vehicle detection device arranged at the exit of the target parking lot; and judging whether data transfer of the bound vehicle of the user terminal is completed, and instructing the exit of the target parking lot to release the bound vehicle in a case that it is determined that the data transfer is completed.

In a specific implementation, after transferring the transfer data volume from the account of the user terminal to the account of the parking management server based on the data transfer request submitted by the user terminal, the data transfer server may notify the parking management server that the data transfer of the bound vehicle is completed, and the parking management server may mark a payment state of the bound vehicle as complete after receiving the notification. The vehicle detection device arranged at the exit of the target parking lot identifies a vehicle arriving at the exit. In a case that it is detected that the bound vehicle arrives at the exit of the target parking lot and a current payment state of the bound vehicle is incomplete, the user terminal is notified to transfer data; or in a case that the current payment state of the bound vehicle is complete, the exit of the target parking lot is notified to release the bound vehicle. For example, an open instruction is sent to a fence of the exit, and the fence is controlled to rise to release the bound vehicle to depart from the parking lot.

In an optional embodiment, the parking management method may further include:

sending, by the parking management server, parking position information of the bound vehicle to the user terminal.

In order to facilitate finding the parked vehicle in the target parking lot by the user quickly, the parking management server may push parking position information of the bound vehicle to the user terminal of the user. The parking position information may be a parking space of the bound vehicle in the parking lot, for example 013 parking space in A region at a lower level of the parking lot, or may be a position of the bound vehicle in the parking lot displayed in combination with a navigation map of the parking lot. In a specific implementation, the parking management server may receive vehicle parking information sent by a vehicle detection device arranged at the parking space of the target parking lot, where the vehicle parking information includes a vehicle identifier of the bound vehicle and a device identifier of the vehicle detection device, where the vehicle identifier is obtained via a license plate automatic recognition by the vehicle detection device arranged at the parking space. The parking management server determines a parking position corresponding to the device identifier carried in the vehicle parking information based on a preset correspondence between device identifiers of the vehicle detection devices and parking positions in the target parking lot, and obtains parking position information of the bound vehicle. The parking management server may record current parking position information of the vehicle in a parking service record of the vehicle, and acquires a communication identifier of the user terminal bound to the vehicle identifier of the bound vehicle and sends the parking position information of the bound vehicle to the user terminal in a case that a preset trigger condition is met. The preset trigger condition may include that: a parking space query request sent by the user terminal is received, or it is detected that the bound vehicle is parked at the current parking space for a preset waiting time period (for example 5 minutes). A certain waiting time period is set to avoid that the user can not receive the parking position information since the user is at a position in the parking lot where a communication signal is weak.

In an optional embodiment, the parking management method may further include step 11) to step 13) in the following.

In step 11), the parking management server acquires a vehicle searching request sent by the user terminal, where the vehicle searching request carries current position information of the user terminal in the target parking lot.

In many cases, even if the user remembers the parking space where the vehicle is parked, the user needs to consume a lot of time and energy to find his vehicle in the parking lot if the parking lot is big or signs for region division are not clearly enough. In order to find the parked vehicle in the target parking lot quickly, the user may send a vehicle searching request to the parking management server by the user terminal, where the vehicle searching request carries current position information of the user terminal in the target parking lot. The current position information of the user terminal in the target parking lot may be acquired by a positioning module in the user terminal or may be input manually by the user. For example, a current parking space number—1A013 (number 013 in A region at a first lower level) seen by the user nearby may function as the current position information of the user terminal in the target parking lot.

In step 12), the parking management server generates vehicle searching route information based on the position information of the user terminal and parking position information of the bound vehicle of the user terminal.

Specifically, the parking management server may use the position information of the user terminal as a path starting position and use the parking position information of the bound vehicle of the user terminal as a path destination, thereby planning the path and generating a vehicle searching route from the current position of the user terminal to the parking position.

In step 13), the parking management server sends the vehicle searching route information to the user terminal.

Specifically, the vehicle searching route information may be word navigation information, voice navigation information, or a vehicle searching route marked in a navigation map of the parking lot for prompting the user to go to the vehicle parking position.

In an optional embodiment, the parking management method may further include:

sending, by the parking management server, admission prompt information carrying an admission time instant to the user terminal, in a case that it is detected that the bound vehicle of the user terminal enters the target parking lot.

In a specific implementation, the parking management server may identify a vehicle entering the target parking lot by a vehicle detection device arranged at an entrance of the target parking lot. In a case that it is detected that a vehicle enters the target parking lot, the parking management server acquires a vehicle identifier of the vehicle, acquires a communication identifier of the user terminal bound to the vehicle identifier, and sends the admission prompt information to the user terminal. The admission prompt information may carry the admission time instant, the vehicle identifier information and a preset welcome prompt, or the like.

In an optional embodiment, the parking management method may further include:

pushing, by the parking management server, a parking space idle state of the target parking lot to a communication server at regular time, where the communication server may collect parking space idle states pushed by parking management servers of multiple target parking lots. The user may submit a parking space idle state query request for a target region to the communication server by the user terminal, and the communication server feeds back, based on the request, the parking space idle states of the multiple target parking lots within the target region to the user terminal, such that the user can quickly find parking lot positions and parking space idle states of the target region.

The parking management server according to the embodiment of the present disclosure may send the parking service information to the user terminal bound to the vehicle, such that the user can send a data transfer request for the parking service based on the parking service information by the user terminal, thereby greatly improving the efficiency of the parking management and greatly reducing the time and energy consumed of the user on the parking service.

Figure 2:
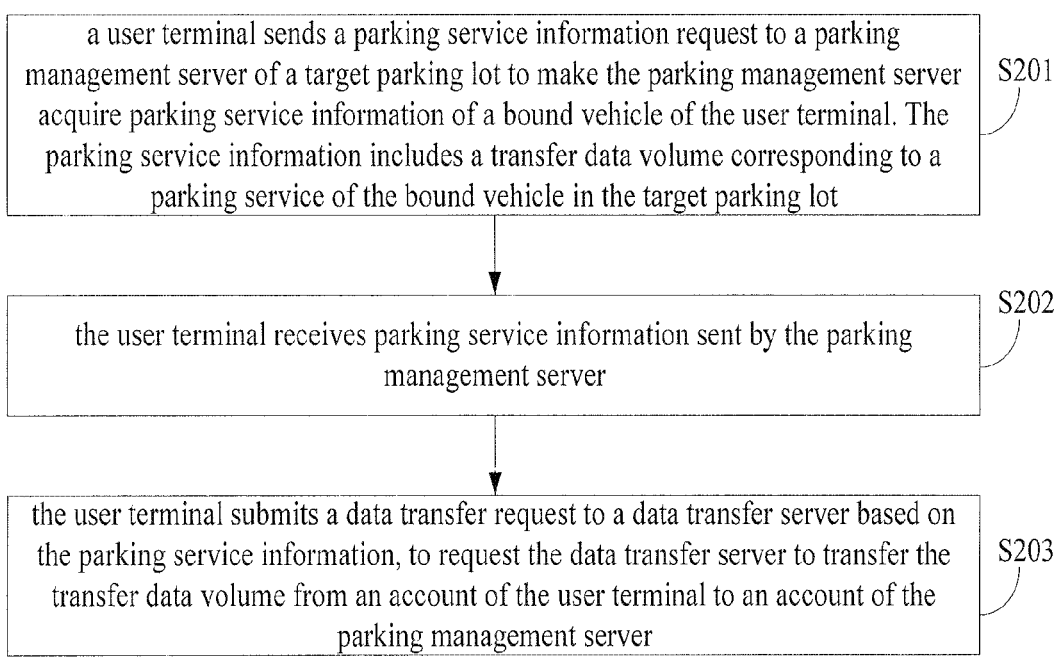
FIG. 2 is a schematic flowchart of a parking management method according to another embodiment of the present disclosure.

FIG. 2 is a schematic flowchart of a parking management method according to another embodiment of the present disclosure, and it is described mainly from a user terminal side. As shown in FIG. 2, the flow of the parking management method according to the embodiment may include step S201 to step S203 in the following.

In step S201, a user terminal sends a parking service information request to a parking management server of a target parking lot to make the parking management server acquire parking service information of a bound vehicle of the user terminal. The parking service information includes a transfer data volume corresponding to a parking service of the bound vehicle in the target parking lot.

In a specific implementation, the user terminal may send the parking service information request to the parking management server of the target parking lot by scanning a two dimensional code of a parking service of the target parking lot, or send the parking service information request to a communication public service number corresponding to the parking management server of the target parking lot. The parking service request may carry a communication identifier of the user terminal and/or a vehicle identifier of the bound vehicle of the user terminal. For example, the user terminal may register a vehicle identifier bound to a communication identifier of the user terminal with a communication server in advance, thereby sending a parking service information request carrying the vehicle identifier bound to the communication identifier.

In step S202, the user terminal receives parking service information sent by the parking management server.

The parking service information may include a vehicle identifier of a vehicle, identifier information of the target parking lot, a parking time instant and a transfer data volume corresponding to a parking service of the bound vehicle in the target parking lot.

In step S203, the user terminal submits a data transfer request to a data transfer server based on the parking service information, to request the data transfer server to transfer the transfer data volume from an account of the user terminal to an account of the parking management server.

FIG. 6 is a schematic diagram showing a display effect of parking service information received by a user terminal, which is sent by a parking management server. At the bottom of an interface shown in FIG. 6, a key of "start payment" may be provided. A user of the user terminal may submit a data transfer request to a data transfer server by clicking the key, to request the data transfer server to transfer the transfer data volume from an account of the user terminal to an account of the parking management server, where the data transfer request may carry the transfer data volume carried in the parking service information and the communication identifier of the parking management server.

The parking management server judges whether data transfer corresponding to the bound vehicle of the user terminal is completed in a case that it is detected that the bound vehicle of the user terminal arrives at an exit of the target parking lot; and notifies the exit of the target parking lot to release the bound vehicle in a case that it is determined that the data transfer is completed.

In an optional embodiment, the parking management method may further include:

receiving, by the user terminal, parking position information of the bound vehicle sent by the parking management server.

In order to facilitate finding the parked vehicle in the target parking lot by the user quickly, the parking management server may push parking position information of the bound vehicle to the user of the user terminal. The parking position information may be a parking space of the bound vehicle in the parking lot, for example 013 parking space in A region at a first lower level of the parking lot, or may be a position of the bound vehicle in the parking lot displayed in combination with a navigation map of the parking lot. In a specific implementation, the parking management server may identify a vehicle identifier of a vehicle parked at the parking space by a vehicle detection device arranged at each parking space; record current parking position information of the vehicle in a parking service record of the vehicle; and acquire a communication identifier of a user terminal bound to the vehicle identifier of the bound vehicle and send the parking position information of the bound vehicle to the user terminal in a case that a preset trigger condition is met. The preset trigger condition may include that: a parking space query request sent by the user terminal is received, or it is detected that the bound vehicle is parked at the current parking space for a preset waiting time period (for example 5 minutes). A certain waiting time period is set to avoid that the user can not receive the parking position information since the user is at a position in the parking lot where a communication signal is weak.

In an optional embodiment, the parking management method may further include:

sending, by the user terminal, a vehicle searching request to the parking management server, where the vehicle searching request carries current position information of the user terminal in the target parking lot, such that the parking management server generates vehicle searching route information based on the position information of the user terminal and parking position information of the bound vehicle of the user terminal.

In many cases, even if the user remembers the parking space where the vehicle is parked, the user needs to consume a lot of time and energy to find his vehicle in the parking lot if the parking lot is big or signs for region division are not clearly enough. In order to find the parked vehicle in the target parking lot quickly, the user may send a vehicle searching request to the parking management server by the user terminal, where the vehicle searching request carries current position information of the user terminal in the target parking lot. The current position information of the user terminal in the target parking lot may be acquired by a positioning module in the user terminal or may be input manually by the user. For example, a current parking space number—1A013 (number 013 in A region at a first lower layer) seen by the user nearby may function as the current position information of the user terminal in the target parking lot.

The user terminal receives the vehicle searching route information sent by the parking management server.

Specifically, the parking management server may use the position information of the user terminal as a path starting position and use the parking position information of the bound vehicle of the user terminal as a path destination, thereby planning the path and generating a vehicle searching route from the current position of the user terminal to the parking position. The vehicle searching route information may be word navigation information, voice navigation information, or a vehicle searching route marked in a navigation map of the parking lot for prompting the user how to go to the vehicle parking position.

In an optional embodiment, the parking management method may further include:

submitting, by a user via a user terminal, a parking space idle state query request for a target region to a communication server, where the communication server feeds back, based on the request, parking space idle states of multiple target parking lots within a target region to the user terminal, such that the user can find parking lot positions and parking space idle states of the target region quickly. In a specific implementation, the parking management server may push the parking space idle space of the target parking lot to the communication server at regular time, and the communication server may collect parking space idle states pushed by parking management servers of the multiple target parking lots.

The user terminal according to the embodiment of the present disclosure can request for the parking service information from the parking management server, such that the user can send a data transfer request for a parking service based on the parking service information by the user terminal, thereby greatly improving the efficiency the parking management and greatly reducing time and energy consumed of the user on the parking service.

Figure 3:
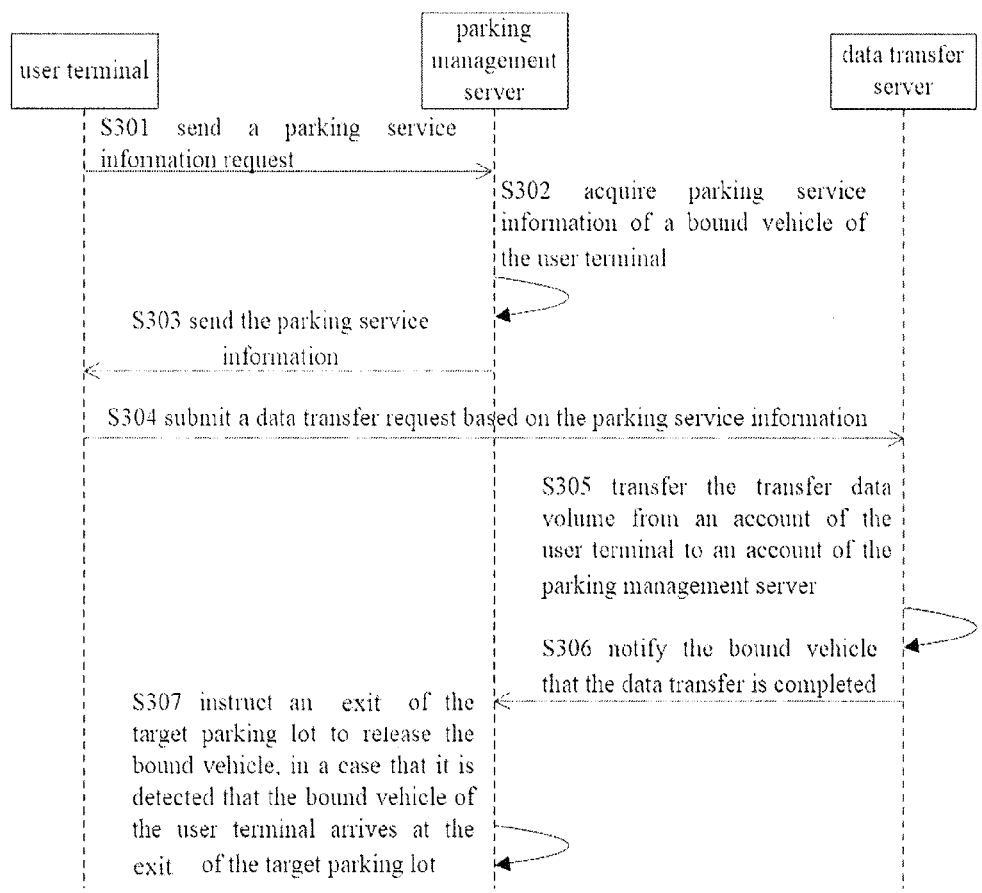
FIG. 3 is a schematic flowchart of a parking management method according to another embodiment of the present disclosure.

FIG. 3 is a schematic flowchart of a parking management method according to another embodiment of the present disclosure, and it is described mainly from a user terminal side, a parking management server side and a data transfer server side. As shown in FIG. 3, the flow of the parking management method according to the embodiment may include step S301 to step S306 in the following.

In step S301, a user terminal sends a parking service information request to a parking management server of a target parking lot.

In a specific implementation, the user terminal may send the parking service information request to the parking management server of the target parking lot by scanning a two dimensional code of a parking service of the target parking lot, or send the parking service information request to a communication public service number corresponding to the parking management server of the target parking lot. The parking service request may carry a communication identifier of the user terminal and/or a vehicle identifier of a bound vehicle of the user terminal. For example, the user terminal may register a vehicle identifier bound to a communication identifier of the user terminal with a communication server in advance, and thereby sending a parking service information request carrying the vehicle identifier bound to the communication identifier.

In step S302, the parking management server acquires parking service information of the bound vehicle of the user terminal, where the parking service information includes a transfer data volume corresponding to a parking service of the bound vehicle in the target parking lot.

In a specific implementation, in a case that it is detected that a vehicle enters the target parking lot, the parking management server may receive vehicle admission information sent by a vehicle detection device arranged at an entrance of the target parking lot. The vehicle admission information includes a vehicle identifier of the bound vehicle (for example a license plate number) and an admission time instant when the bound vehicle passes through the entrance of the target parking lot, which are obtained via a license plate automatic recognition by a vehicle detection device arranged at the entrance of the target parking lot. The parking management server generates, maintains and manages parking service information of the bound vehicle based on the admission time instant when the bound vehicle passes through the entrance of the target parking lot. If a driver of the vehicle registers a communication identifier of the bound user terminal in advance, the parking service record, the vehicle identifier and the communication identifier may be managed in an association manner. In practice, the parking service record of the vehicle may be acquired based on the vehicle identifier or the bound communication identifier, and current parking service information of the vehicle is acquired based on the current parking service record. The parking service information may include a vehicle identifier of the vehicle, identification information of the target parking lot, a parking time instant and a transfer data volume corresponding to a parking service of the bound vehicle in the target parking lot.

In step S303, the parking management server sends the parking service information to the user terminal.

In a specific implementation, the parking management server may acquire the vehicle identifier of the bound vehicle of the user terminal carried in the parking service information request, inquire a parking service record of the bound vehicle of the user terminal based on the vehicle identifier, and generate parking service information of the bound vehicle of the user terminal based on the parking service record. In another embodiment, the parking management server may acquire, based on a communication identifier of the user terminal carried in the parking service information, a vehicle identifier bound to the communication identifier of the user terminal. For example, the parking management server requests to acquire the vehicle identifier bound to the communication identifier of the user terminal from the communication server, inquires a parking service record of the bound vehicle of the user terminal based on the vehicle identifier, and generates parking service information of the bound vehicle of the user terminal based on the parking service record.

In step S304, the user terminal submits a data transfer request to a data transfer server based on the parking service information.

FIG. 6 is a schematic diagram showing a display effect of parking service information received by a user terminal, which is sent by a parking management server. At the bottom of an interface shown in FIG. 6, a key of "start payment" may be provided. A user of the user terminal may submit a data transfer request to a data transfer server by clicking the key, to request the data transfer server to transfer the transfer data volume from an account of the user terminal to an account of the parking management server, where the data transfer request may carry the transfer data volume carried in the parking service information and the communication identifier of the parking management server.

In step S305, the data transfer server transfers the data transfer volume from an account of the user terminal to an account of the parking management server.

In step S306, the data transfer server notifies the parking management server that data transfer of the bound vehicle is completed.

In step S307, the parking management server judges whether the data transfer of the bound vehicle of the user terminal is completed in a case that it is detected that the bound vehicle of the user terminal arrives at an exit of the target parking lot; and instructs the exit of the target parking lot to release the bound vehicle in a case that it is determined that the data transfer is completed.

In a specific implementation, after transferring the transfer data volume from the account of the user terminal to the account of the parking management server based on the data transfer request submitted by the user terminal, the data transfer server may notify the parking management server that the data transfer of the bound vehicle is completed, and the parking management server may mark a payment state of the bound vehicle as complete after receiving the notification. In a case that the bound vehicle arrives at an exit of the target parking lot, the parking management server receives vehicle departure information sent by a vehicle detection device arranged at the exit of the target parking lot. The vehicle departure information includes a vehicle identifier of the bound vehicle arriving at the exit of the target parking lot, where the vehicle identifier is obtained via a license plate automatic recognition by the vehicle detection device arranged at the exit of the target parking lot. The parking management server judges whether data transfer of the bound vehicle of the user terminal is completed. In a case that the current payment state of the bound vehicle is incomplete, the user terminal is instructed to transfer data; or in a case that the current payment state of the bound vehicle is complete, the exit of the target parking lot is instructed to release the bound vehicle. For example, an open instruction is sent to a fence of the exit, and the fence is controlled to rise to release the bound vehicle to depart from the parking lot.

Figure 4:
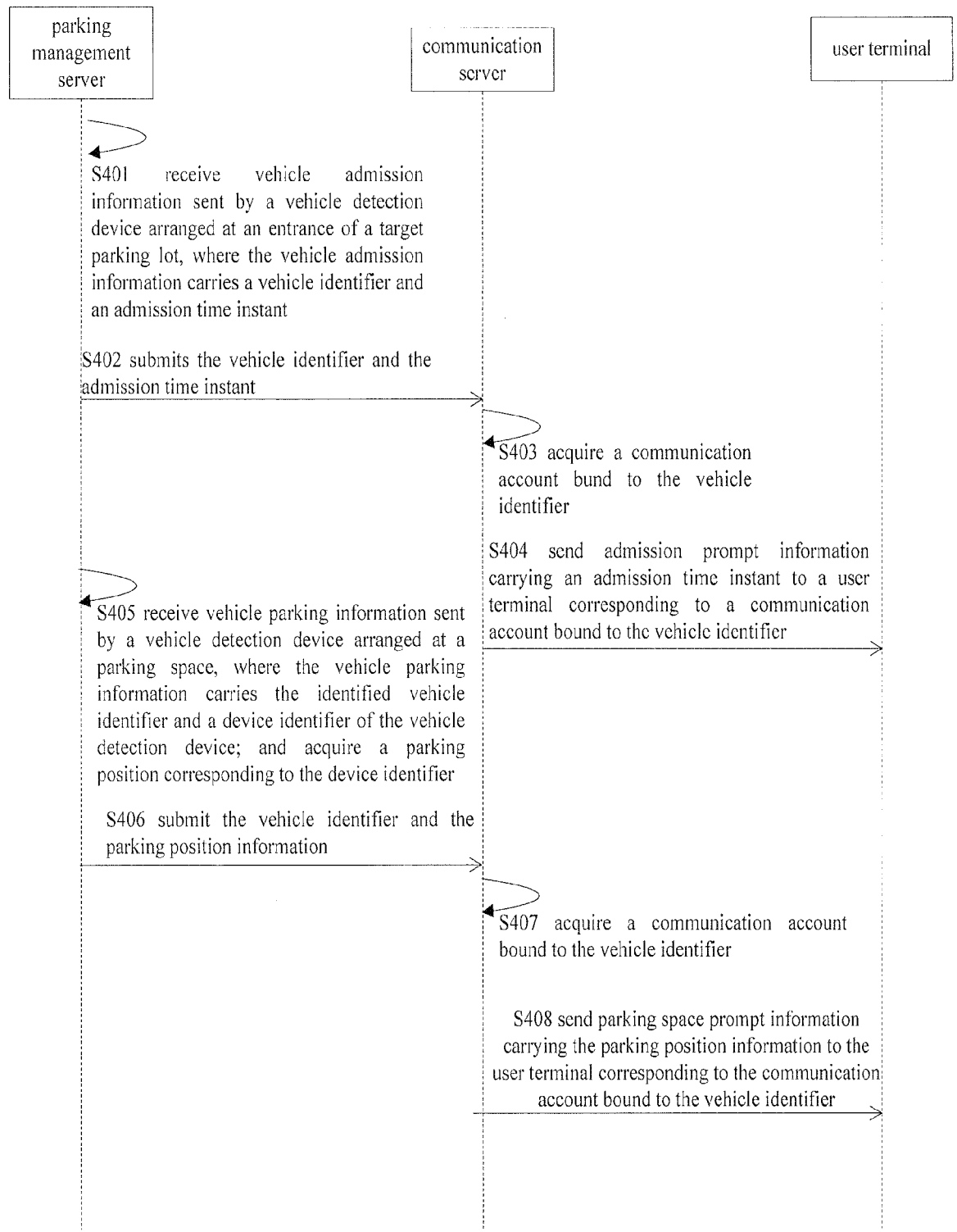
FIG. 4 is a schematic diagram showing a process that a parking management server pushes information to a user terminal according to an embodiment of the present disclosure.

FIG. 4 is a schematic diagram showing a process that a parking management server pushes information to a user terminal according to an embodiment of the present disclosure, and it is described mainly from a communication server side and a parking management server side. As shown in FIG. 4, in the embodiment, the process of pushing information may include step S401 to step S408 in the following.

In step S401, in a case that a vehicle enters a target parking lot, a parking management server receives vehicle admission information sent by a vehicle detection device arranged at an entrance of the target parking lot, where the vehicle admission information carries a vehicle identifier and an admission time instant.

In step S402, the parking management server submits the vehicle identifier and the admission time instant to a communication server.

In step S403, the communication server acquires a communication account bound to the vehicle identifier.

In step S404, the communication server sends admission prompt information carrying the admission time instant to a user terminal corresponding to the communication account bound to the vehicle identifier.

In step S405, in a case that the vehicle is parked at a parking space of the target parking lot, the parking management server receives vehicle parking information sent by a vehicle detection device arranged at the parking space, where the vehicle parking information carries a vehicle identifier and a device identifier of the vehicle detection device, where the identifier of the vehicle is recognized by the vehicle detection device; and acquires a parking position corresponding to the device identifier.

In step S406, the parking management server submits the vehicle identifier and parking position information to a communication server.

In step S407, the communication server acquires a communication account bound to the vehicle identifier.

In step S408, the communication server sends parking space prompt information carrying the parking position information to a user terminal corresponding to the communication account bound to the vehicle identifier.

It should be noted that, in the embodiment, a bound relationship between the vehicle identifier and the communication account is maintained and managed by a communication server, and the parking management server communicates with the user terminal via the communication server, which are not limited in the present disclosure. In other possible implementations, the parking management server may save the bound relationship between the vehicle identifier and the communication account and directly communicate with the user terminal corresponding to the vehicle based on the communication account without the communication server, or may communicate with the user terminal via another communication server.

Figure 5:
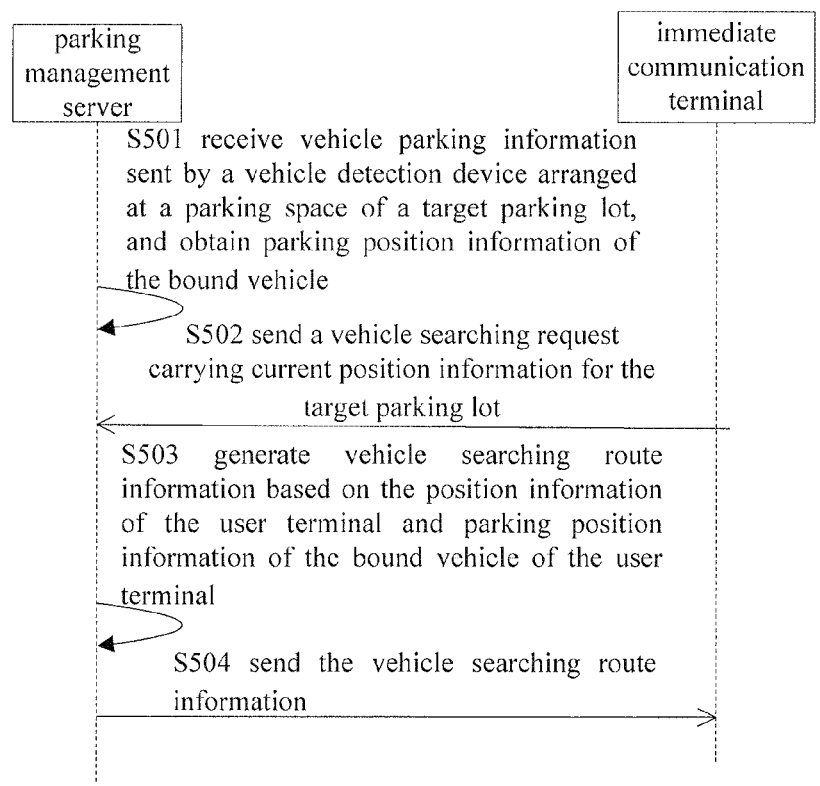
FIG. 5 is a schematic flowchart showing a process that a user terminal requests for a vehicle searching route from a parking management server in a parking management method according to another embodiment of the present disclosure.

FIG. 5 is a schematic flowchart showing a process that a user terminal requests for a vehicle searching route from a parking management server in a parking management method according to another embodiment of the present disclosure. As shown in FIG. 5, the process may include step S501 to step S504 in the following.

In step S501, a parking management server receives vehicle parking information sent by a vehicle detection device arranged at a parking space of a target parking lot, where the vehicle parking information includes a vehicle identifier of a bound vehicle and a device identifier of the vehicle detection device, where the vehicle identifier is obtained via a license plate automatic recognition by the vehicle detection device arranged at the parking space. The parking management server determines a parking position corresponding to the device identifier carried in the vehicle parking information based on a preset correspondence between device identifiers of vehicle detection devices and parking positions in the target parking lot, and obtains parking position information of the bound vehicle.

In step S502, a user terminal sends a vehicle searching request to the parking management server, where the vehicle searching request carries current position information of the user terminal in the target parking lot.

In many cases, even if the user remembers the parking space where the vehicle is parked, the user needs to consume a lot of time and energy to find his vehicle in the parking lot if the parking lot is big or signs for region division are not clearly enough. In order to find the parked vehicle in the target parking lot quickly, the user may send a vehicle searching request to the parking management server by the user terminal, where the vehicle searching request carries current position information of the user terminal in the target parking lot. The current position information of the user terminal in the target parking lot may be acquired by a positioning module in the user terminal or may be input manually by the user. For example, a current parking space number—1A013 (number 013 in A region at a first lower level) seen by the user nearby may function as the current position information of the user terminal in the target parking lot.

In step S503, the parking management server generates vehicle searching route information based on the position information of the user terminal and parking position information of the bound vehicle of the user terminal.

In a specific implementation, the parking management server may acquire, based on a communication identifier of the user terminal, a vehicle identifier bound to the communication identifier, determine a bound vehicle of the user terminal, and acquire current parking position information of the vehicle recorded in a parking service record of the vehicle based on the vehicle identifier of the bound vehicle. Then, the parking management server may use the position information of the user terminal as a path starting position and use the parking position information of the bound vehicle of the user terminal as a path destination, thereby planning the path and generating a vehicle searching route from the current position of the user terminal to the parking position.

In step S504, the parking management server sends the vehicle searching route information to the user terminal. The vehicle searching route information may be word navigation information, voice navigation information, or a vehicle searching route marked in a navigation map of the parking lot for prompting the user to go to the vehicle parking position.

The parking management server in the embodiment may return, based on a vehicle searching request sent by the user terminal, information of a vehicle searching route from a current position of the user terminal in the parking lot to a parking position of the bound vehicle to the user terminal, such that the user can find the vehicle parking position in the parking lot conveniently and quickly based on the vehicle searching route information.

Figure 7:
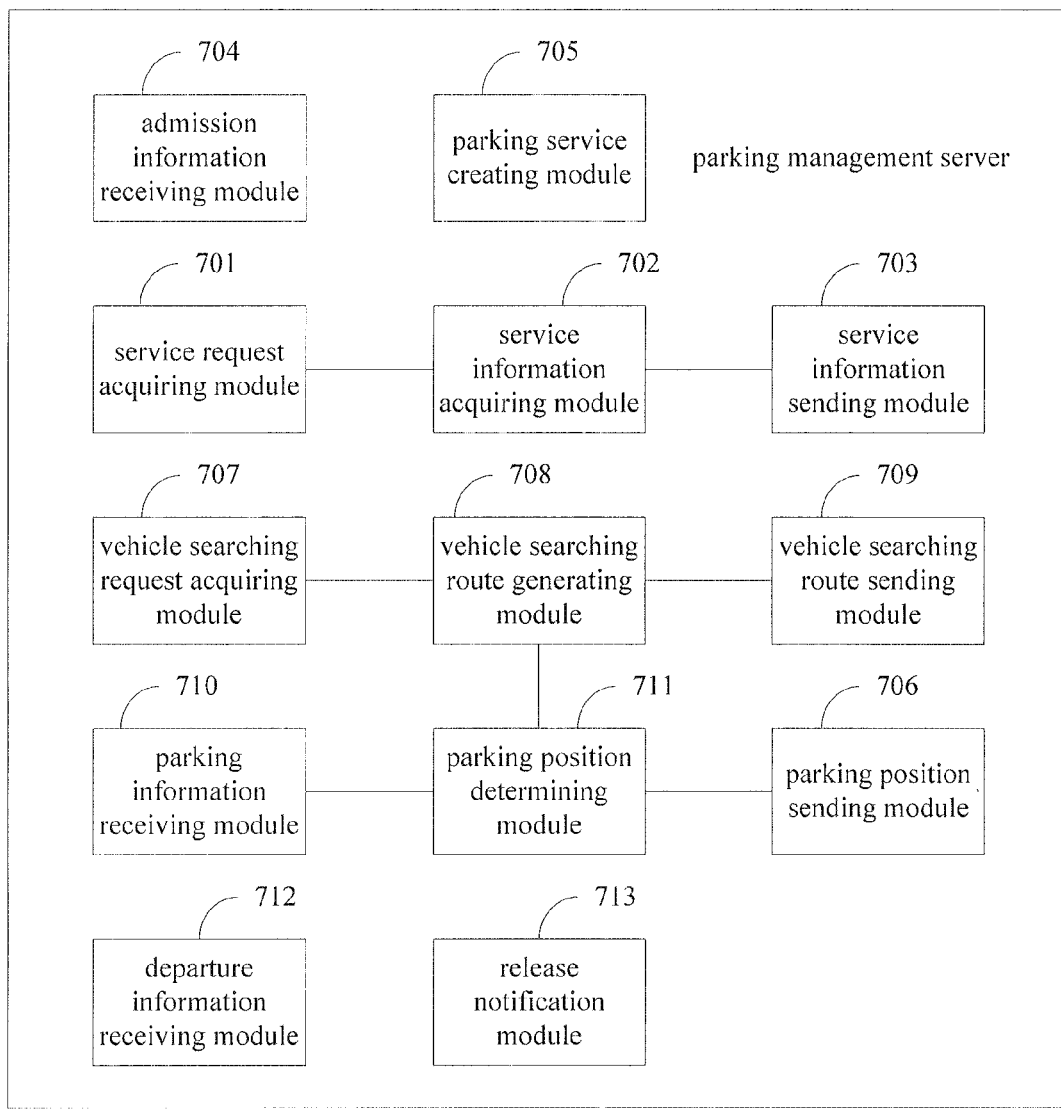
FIG. 7 is a schematic structural diagram of a parking management server according to an embodiment of the present disclosure.

FIG. 7 is a schematic structural diagram of a parking management server according to an embodiment of the present disclosure. As shown in FIG. 7, the parking management server in the embodiment may include a service request acquiring module 701, a service information acquiring module 702 and a service information sending module 703.

The service request acquiring module 701 is configured to acquire a parking service information request sent by a user terminal.

In a specific implementation, the user terminal may send the parking service information request to a parking management server of a target parking lot by scanning a two dimensional code of a parking service of the target parking lot, or send the parking service information request to a communication public service number corresponding to the parking management server of the target parking lot. The parking service request may carry a communication identifier of the user terminal and/or a vehicle identifier of the bound vehicle of the user terminal. For example, the user terminal may register a vehicle identifier bound to the communication identifier of the user terminal with a communication server in advance, thereby sending a parking service information request carrying the vehicle identifier bound to the communication identifier.

It should be noted that, in an embodiment of the present disclosure, the user terminal and the parking management server may communicate with each other via the communication server. For example, in a case that the user terminal is to send a parking service information request to the parking management server, the user terminal may submit the parking service information request to the parking management server, where the parking service information request carries a communication identifier of the parking management server, such that the communication server pushes the parking service information request to the parking management server, and the service request acquiring module 701 of the parking management server acquires the parking service information request sent by the user terminal via the communication server. Other modules of the parking management server have similar processes, which are not described subsequently.

The service information acquiring module 702 is configured to acquire parking service information of the bound vehicle of the user terminal, where the parking service information includes a transfer data volume corresponding to a parking service of the bound vehicle in the target parking lot.

In a specific implementation, in a case that it is detected that a vehicle enters the target parking lot, the parking management server may acquire a vehicle identifier of the vehicle via a license plate automatic recognition technology, for example a license plate number, and maintain and manage a parking service record of the vehicle. If a driver of the vehicle registers a communication identifier of a bound user terminal in advance, the parking service record, the vehicle identifier and the communication identifier may be managed in an association manner. In practice, the service information acquiring module 702 may acquire the parking service record of the vehicle based on the vehicle identifier or the bound communication identifier, and acquire current parking service information of the vehicle based on the current parking service record. The parking service information may include the vehicle identifier of the vehicle, identifier information of the target parking lot, a parking time instant and a transfer data volume corresponding to a parking service of the bound vehicle in the target parking lot and so on.

In an optional embodiment, the service information acquiring module 702 may acquire the vehicle identifier of the bound vehicle of the user terminal carried in the parking service information request, inquire a parking service record of the bound vehicle of the user terminal based on the vehicle identifier, and generate parking service information of the bound vehicle of the user terminal based on the parking service record. In another embodiment, the service information acquiring module 702 may acquire, based on a communication identifier of the user terminal carried in the parking service information, a vehicle identifier bound to the communication identifier of the user terminal. For example, the service information acquiring module 702 requests to acquire the vehicle identifier bound to the communication identifier of the user terminal from a communication server, inquires a parking service record of the bound vehicle of the user terminal based on the vehicle identifier, and generates parking service information of the bound vehicle of the user terminal based on the parking service record.

The service information sending module 703 is configured to send the parking service information to the user terminal, such that the user terminal submits a data transfer request to a data transfer server based on the parking service information, to request the data transfer server to transfer the transfer data volume from an account of the user terminal to an account of the parking management server.

FIG. 6 is a schematic diagram showing a display effect of parking service information received by a user terminal, which is sent by a parking management server. At the bottom of an interface shown in FIG. 6, a key of "start payment" may be provided. A user of the user terminal may submit a data transfer request to a data transfer server by clicking the key, to request the data transfer server to transfer the transfer data volume from an account of the user terminal to an account of the parking management server, where the data transfer request may carry the transfer data volume carried in the parking service information and the communication identifier of the parking management server.

In an optional embodiment, the parking management server may further include:

an admission information receiving module 704 configured to receive vehicle admission information sent by a vehicle detection device arranged at an entrance of the target parking lot, where the vehicle admission information includes a vehicle identifier of the bound vehicle arriving at the entrance of the target parking lot and an admission time instant when the bound vehicle passes through the entrance of the target parking lot, where the vehicle identifier and the admission time instant are obtained via a license plate automatic recognition by the vehicle detection device arranged at the entrance of the target parking lot; and a parking service creating module 705 configured to generate parking service information of the bound vehicle based on the admission time instant when the bound vehicle passes through the entrance of the target parking lot.

In an optional embodiment, the parking management server may include:

a parking position sending module 706 configured to send parking position information of the bound vehicle to the user terminal.

In order to facilitate finding the parked vehicle in the target parking lot by the user quickly, the parking position sending module 706 may push parking position information of the bound vehicle to the user terminal of the user. The parking position information may be a parking space of the bound vehicle in the parking lot, for example 013 parking space in A region at a negative layer of the parking lot, or may be a position of the bound vehicle in the parking lot displayed in combination with a navigation map of the parking lot. In a specific implementation, the parking management server may identify a vehicle identifier of a vehicle parked at the parking space by a vehicle detection device arranged at each parking space, and record current parking position information of the vehicle in a parking service record of the vehicle. In a case that a preset trigger condition is met, the parking position sending module 706 acquires a communication identifier of the user terminal bound to the vehicle identifier of the bound vehicle and sends the parking position information of the bound vehicle to the user terminal. The preset trigger condition may include that: a parking space query request sent by the user terminal is received, or it is detected that the bound vehicle is parked at the current parking space for a preset waiting time period (for example 5 minutes). A certain waiting time period is set to avoid that the user can not receive the parking position information since the user is at a position in the parking lot where a communication signal is weak.

In an optional embodiment, the parking management server may further include a vehicle searching request acquiring module 707, a vehicle searching route generating module 708 and a vehicle searching route sending module 709.

The vehicle searching request acquiring module 707 is configured to acquire a vehicle searching request sent by the user terminal, where the vehicle searching request carries current position information of the user terminal in the target parking lot.

In many cases, even if the user remembers the parking space where the vehicle is parked, the user needs to consume a lot of time and energy to find his vehicle in the parking lot if the parking lot is big or signs for region division are not clearly enough. In order to find the parked vehicle in the target parking lot quickly, the user may send a vehicle searching request to the parking management server by the user terminal, where the vehicle searching request carries current position information of the user terminal in the target parking lot. The current position information of the user terminal in the target parking lot may be acquired by a positioning module in the user terminal or may be input manually by the user. For example, a current parking space number—1A013 (number 013 in A region at a first lower layer) seen by the user nearby may function as the current position information of the user terminal in the target parking lot.

The vehicle searching route generating module 708 is configured to generate vehicle searching route information based on the position information of the user terminal and parking position information of the bound vehicle of the user terminal.

In a specific implementation, the vehicle searching route generating module 708 may acquire, based on a communication identifier of the user terminal, a vehicle identifier bound to the communication identifier, determine a bound vehicle of the user terminal and acquire current parking position information of the vehicle recorded in a parking service record of the vehicle based on the vehicle identifier of the bound vehicle. Then, the vehicle searching route generating module 708 may use the position information of the user terminal as a path starting position and use the parking position information of the bound vehicle of the user terminal as a path destination, thereby planning the path and generating a vehicle searching route from the current position of the user terminal to the parking position.

The vehicle searching route sending module 709 is configured to send the vehicle searching route information to the user terminal.

Specifically, the vehicle searching route information may be word navigation information, voice navigation information, or a vehicle searching route marked in a navigation map of the parking lot for prompting the user to go to the vehicle parking position.

In an optional embodiment, the parking management server may further include:

a parking information receiving module 710 configured to receive vehicle parking information sent by a vehicle detection device arranged at a parking space of a target parking lot, where the vehicle parking information includes a vehicle identifier of the bound vehicle and a device identifier of the vehicle detection device, where the vehicle identifier is obtained via a license plate automatic recognition by the vehicle detection device arranged at the parking space; and a parking position determining module 711 configured to determine, based on a preset correspondence between device identifiers of vehicle detection devices and parking positions in the target parking lot, a parking position corresponding to the device identifier carried in the vehicle parking information, and obtain parking position information of the bound vehicle.

In an optional embodiment, the parking management server may further include:

a departure information receiving module 712 configured to receive vehicle departure information sent by a vehicle detection device arranged at an exit of the target parking lot, where the vehicle departure information includes a vehicle identifier of the bound vehicle arriving at the exit of the target parking lot, which is obtained via a license plate recognition by the vehicle detection device arranged at the export of the target parking lot; and a release notifying module 713 configure to judge whether data transfer of the bound vehicle of the user terminal is completed in a case that the vehicle departure information is received by the departure information receiving module 712; and instruct the exit of the target parking lot to release the bound vehicle in a case that it is determined that the data transfer is completed.

In an optional embodiment, the parking management server may further include:

an admission prompt information sending module configured to send admission prompt information carrying an admission time instant to the user terminal, in a case that it is detected that the bound vehicle of the user terminal enters the target parking lot.

In a specific implementation, the parking management server may identify a vehicle arriving at the target parking lot by the vehicle detection device arranged at the entrance of the target parking lot. In a case that it is detected that the vehicle enters the target parking lot, the parking management server acquires the vehicle identifier of the vehicle, acquires a communication identifier of the user terminal bound to the vehicle identifier, and sends the admission prompt information to the user terminal. The admission prompt information may carry the admission time instant, identifier information of the parking lot and a preset welcome prompt and so on.

In an optional embodiment, the parking management server may further include:

a parking space state submitting module configured to push a parking space idle state of the target parking lot to a communication server at regular time, where the communication server may collect parking space idle states pushed by parking management servers of multiple target parking lots; a user may submit a parking space idle state query request for a target region to the communication server by the user terminal, the communication server feeds back, based on the request, parking space idle states of the multiple target parking lots within the target region to the user terminal, such that the user can find parking lot positions and parking space idle states of the target region quickly.

The parking management server according to the embodiment of the present disclosure may send parking service information to the user terminal bound to the vehicle, such that the user can send a data transfer request for a parking service based on the parking service information by the user terminal, thereby greatly improving the efficiency of a parking management and greatly reducing time and energy consumed of the user on the parking service.

Figure 8:
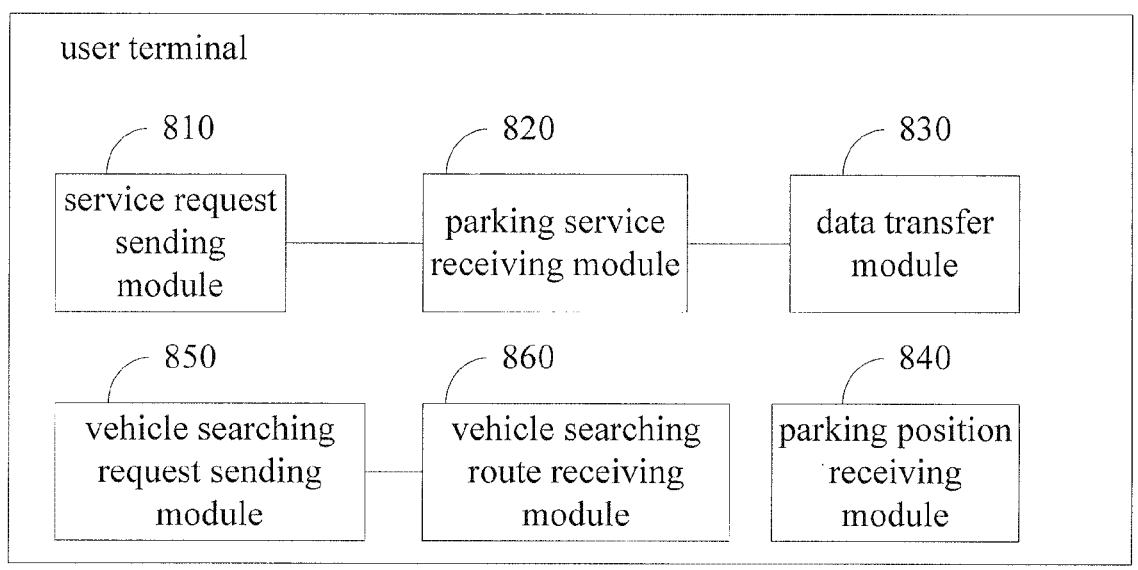
FIG. 8 is schematic structure diagram of a user terminal according to an embodiment of the present disclosure.

FIG. 8 is a schematic structural diagram of a user terminal according to an embodiment of the present disclosure. As shown in FIG. 8, the user terminal in the embodiment may include a service request sending module 810, a parking service receiving module 820 and a data transfer module 830.

The service request sending module 810 is configured to send a parking service information request to a parking management server of a target parking lot to make the parking management server acquire parking service information of a bound vehicle of the user terminal, where the parking service information includes a transfer data volume corresponding to a parking service of the bound vehicle in the target parking lot.

In a specific implementation, the service request sending module 810 may send the parking service information request to the parking management server of the target parking lot by scanning a two dimensional code of a parking service of the target parking lot. The service request sending module 810 may send the parking service information request to a communication public service number corresponding to the parking management server of the target parking lot. The parking service request may carry a communication identifier of the user terminal and/or the vehicle identifier of the bound vehicle of the user terminal. For example, the user terminal may register a vehicle identifier bound to the communication identifier of the user terminal with a communication server in advance, and then the service request sending module 810 may send a parking service information request carrying the vehicle identifier bound to the communication identifier.

The parking service receiving module 820 is configured to receive parking service information sent by the parking management server.

The parking service information may include the vehicle identifier of the vehicle, identifier information of the target parking lot, a parking time instant and a transfer data volume corresponding to a parking service of the bound vehicle in the target parking lot and so on.

The data transfer module 830 is configured to submit a data transfer request to a data transfer server based on the parking service information, to request the data transfer server to transfer the transfer data volume from an account of the user terminal to an account of the parking management server.

FIG. 6 is a schematic diagram showing a display effect of parking service information received by a user terminal, which is sent by a parking management server. At the bottom of an interface shown in FIG. 6, a key of "start payment" may be provided. A user of the user terminal may submit a data transfer request to a data transfer server by clicking the key, to request the data transfer server to transfer the transfer data volume from an account of the user terminal to an account of the parking management server, where the data transfer request may carry the transfer data volume carried in the parking service information and the communication identifier of the parking management server.

The parking management server judges whether data transfer of the bound vehicle of the user terminal is completed in a case that it is detected that the bound vehicle of the user terminal arrives at an export of the target parking lot; and instructs the export of the target parking lot to release the bound vehicle in a case that it is determined that the data transfer is completed.

In an optional embodiment, the user terminal may further include:

a parking position receiving module 840 configured to receive parking position information of the bound vehicle sent by the parking management server.

In order to facilitate finding the parked vehicle in the target parking lot by the user quickly, the parking management server may push parking position information of the bound vehicle to the user terminal of the user. The parking position information may be a parking space of the bound vehicle in the parking lot, for example 013 parking space in A region at a first negative layer of the parking lot, or may be a position of the bound vehicle in the parking lot displayed in combination with a navigation map of the parking lot. In a specific implementation, the parking management server may identify a vehicle identifier of a vehicle parked at the parking space by a vehicle detection device arranged at each parking space; record current parking position information of the vehicle in a parking service record of the vehicle; and acquire a communication identifier of a user terminal bound to the vehicle identifier of the bound vehicle and send the parking position information of the bound vehicle to the user terminal in a case that a preset trigger condition is met. The preset trigger condition may include that: a parking space query request sent by the user terminal is received, or it is detected that the bound vehicle is parked at the current parking space for a preset waiting time period (for example 5 minutes). A certain waiting time period is set to avoid that the user can not receive the parking position information since the user is at a position in the parking lot where a communication signal is weak.

In an optional embodiment, the user terminal may further include:

a vehicle searching request sending module 850 configured to send a vehicle searching request to the parking management server, where the vehicle searching request carries current position information of the user terminal in the target parking lot, such that the parking management server generates vehicle searching route information based on the position information of the user terminal and parking position information of the bound vehicle of the user terminal.

In many cases, even if the user remembers the parking space where the vehicle is parked, the user needs to consume a lot of time and energy to find his vehicle in the parking lot if the parking lot is big or signs for region division are not clearly enough. In order to find the parked vehicle in the target parking lot quickly, the user may send a vehicle searching request to the parking management server by the user terminal, where the vehicle searching request carries current position information of the user terminal in the target parking lot. The current position information of the user terminal in the target parking lot may be acquired by a positioning module in the user terminal or may be input manually by the user. For example, a current parking space number—1A013 (number 013 in A region at a first lower level) seen by the user nearby may function as the current position information of the user terminal in the target parking lot.

Specifically, the parking management server may use the position information of the user terminal as a path starting position and use the parking position information of the bound vehicle of the user terminal as a path destination, thereby planning the path and generating a vehicle searching route from the current position of the user terminal to the parking position.

The vehicle searching route receiving module 860 is configured to receive vehicle searching route information sent by the parking management server. The vehicle searching route information may be word navigation information, voice navigation information, or a vehicle searching route marked in a navigation map of the parking lot for prompting the user to go to the vehicle parking position.

In an optional embodiment, the user terminal may further include:

a parking space state query module configured to submit a parking space idle state query request for a target region to a communication server, where the communication server feeds back, based on the request, parking space idle states of multiple target parking lots within the target region to the user terminal, such that a user can find parking lot positions and parking space idle states of the target region quickly. In a specific implementation, the parking management server may push parking space idle states of the target parking lot to the communication server at regular time, and the communication server may collect parking space idle states pushed by parking management servers of the multiple target parking lots.

The user terminal in the embodiment of the present disclosure may request for parking service information from the parking management server, such that the user may send a data transfer request for a parking service based on the parking service information by the user terminal, thereby greatly improving the efficiency of a parking management and greatly reducing time and energy consumed of the user on the parking service.

Figure 9:
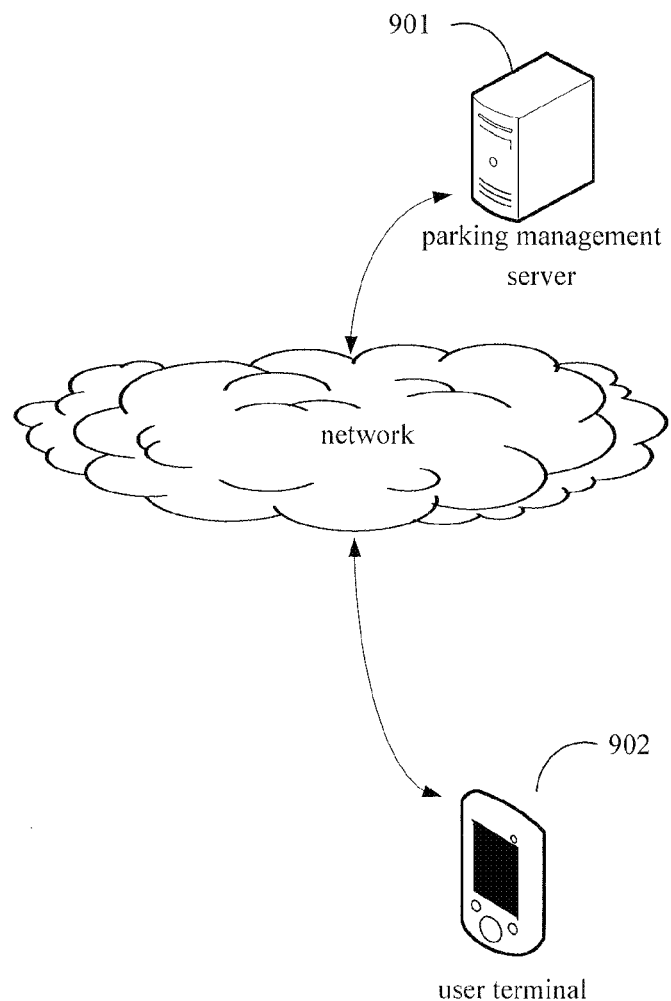
FIG. 9 is a schematic structural diagram of a parking management system according to an embodiment of the present disclosure.

FIG. 9 is a schematic structural diagram of a parking management system according to an embodiment. As shown in FIG. 9, the parking management system in the embodiment may include a parking management server 901 and a user terminal 902, where the user terminal 902 is configured to send a parking service information request to the parking management server 901 of a target parking lot;

the parking management server 901 is configured to acquire parking service information of a bound vehicle of the user terminal 902, where the parking service information includes a transfer data volume corresponding to a parking service of the bound vehicle in the target parking lot; and send the parking service information to the user terminal 902; and the user terminal 902 is further configured to submit a data transfer request to a data transfer server based on the parking service information, to request the data transfer server to transfer the transfer data volume from an account of the user terminal 902 to an account of the parking management server 901.

In an optional embodiment, the parking management server 901 is further configured to, after sending the parking service information to the user terminal 902, judge whether data transfer of the bound vehicle of the user terminal 902 is completed in a case that it is detected that the bound vehicle of the user terminal 902 arrives at an exit of the target parking lot; and instruct the exit of the target parking lot to release the bound vehicle in a case that it is determined that the data transfer is completed.

In an optional embodiment, the parking management server 901 is further configured to send parking position information of the bound vehicle to the user terminal 902.

In an optional embodiment, the parking management server 901 configured to send parking position information of the bound vehicle to the user terminal 902 may include:

the parking management server 901 being configured to acquire a vehicle identifier of the bound vehicle based on a parking service record; and the parking management server 901 being configured to send parking position information of the bound vehicle to the user terminal 902 based on a communication identifier of the user terminal 902 bound to the vehicle identifier.

In an optional embodiment, the user terminal 902 is further configured to send a vehicle searching request to the parking management server 901, where the vehicle searching request carries current position information of the user terminal 902 in the target parking lot;

the parking management server 901 is configured to generate vehicle searching route information based on the position information of the user terminal 902 and parking position information of the bound vehicle of the user terminal 902; and the parking management server 901 is configured to send the vehicle searching route information to the user terminal 902.

Figure 10:
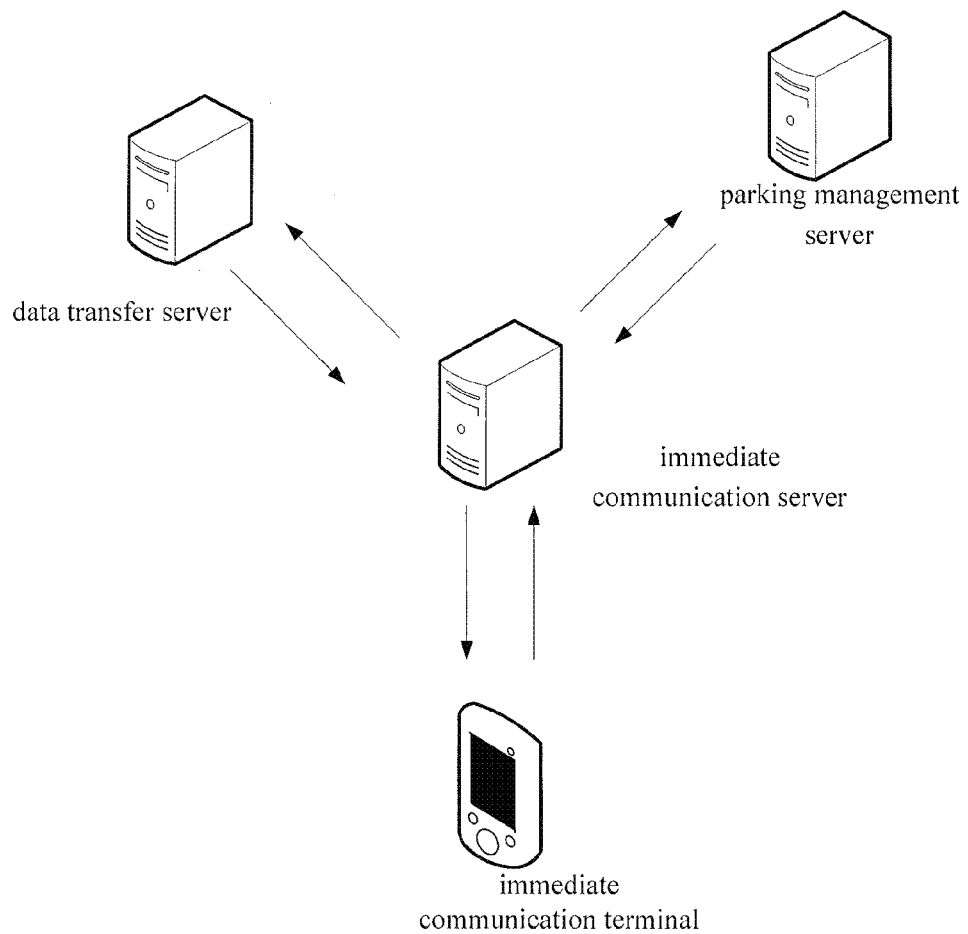
FIG. 10 is a schematic structural diagram of a parking management system according to another embodiment of the present disclosure.

In an optional embodiment, the user terminal may be an immediate communication terminal, and perform data communication with the parking management server and the data transfer server via an immediate communication server, as shown in FIG. 10.

The parking management server in the embodiment of the present disclosure may send parking service information to the user terminal bound to the vehicle, such that the user can send a data transfer request for a parking service based on the parking service information by the user terminal, thereby greatly improving the efficiency of a parking management and greatly reducing time and energy consumed of the user on the parking service.

Those skilled in the art should understand that all or a part of flows in the above method embodiments may be achieved by related hardware instructed by computer programs. The programs may be stored in a computer readable storage medium, the flows of the embodiments of the various methods are performed in a case that the programs are executed. The storage medium may be a magnetic disk, an optical disk, a ROM (Read-Only Memory) or an RAM (Random Access Memory) and so on.

Several embodiments of the present disclosure are disclosed above, which are not intended to limit a scope of the present disclosure. Equivalent changes made still fall within the scope of present claims.

The invention claimed is:

1. A parking management method, comprising:
    acquiring, by a parking management server in communication with a user terminal, a parking service information request automatically initiated by the user terminal by scanning a 2D graphic code associated with a parking service and via a first communication service account of the user terminal registered with a communication service server and a second communication service account of the parking management server registered with the communication service server;
    acquiring, by the parking management server, parking service information of a bound vehicle of the user terminal, wherein the parking service information comprises a payment amount corresponding to a parking service rendered to the bound vehicle in a target parking lot and a location of the user terminal;
    sending, by the parking management server, the parking service information to the user terminal to cause the user terminal to submit a payment transfer request to a payment server in communication with the user terminal and the parking management server, according to the parking service information to request the payment server to transfer the payment amount from a first payment account of the user terminal to a second payment account of the parking management server;
    obtaining, by the parking management server, a first location of the user terminal from the parking service information request sent by the user terminal;
    determining, by the parking management server based on vehicle detection devices distributed in the target parking lot, a second location of the bound vehicle of the user terminal within the target parking lot and sending the second location to the user terminal via the communication service server after a predetermined waiting time period;
    generating, by the parking management server, a navigation information from the first location to the bound vehicle at the second location;
    sending, by the parking management server, the navigation information to the user terminal for display on the user terminal and for navigating the user from the first location to the bound vehicle at the second location;
    receiving vehicle departure information sent by a vehicle detection device arranged at an exit of the target parking lot, wherein the vehicle departure information comprises a vehicle identifier of the bound vehicle arriving at the exit of the target parking lot, wherein the vehicle identifier is obtained via a license plate automatic recognition by the vehicle detection device arranged at the exit of the target parking lot; and judging whether a data transfer corresponding to the bound vehicle of the user terminal is completed, and instructing the exit of the target parking lot to release the bound vehicle in a case that it is determined that the data transfer is completed.

2. The parking management method according to claim 1, wherein the acquiring parking service information of the bound vehicle of the user terminal comprises:

acquiring, by the parking management server, a vehicle identifier of the bound vehicle of the user terminal carried in the parking service information request, inquiring a parking service record of the bound vehicle of the user terminal based on the vehicle identifier, and generating parking service information of the bound vehicle of the user terminal based on the parking service record; or acquiring, by the parking management server, based on a communication identifier of the user terminal carried in the parking service information, a vehicle identifier bound to a communication identifier of the user terminal, inquiring a parking service record of the parking service rendered to the bound vehicle of the user terminal based on the vehicle identifier, and generating parking service information of the bound vehicle of the user terminal based on the parking service record.

3. The parking management method according to claim 1, wherein before acquiring the parking service information request sent by a user terminal, the method further comprises:

receiving, by the parking management server, vehicle admission information sent by a vehicle detection device arranged at an entrance of the target parking lot, wherein the vehicle admission information comprises a vehicle identifier of the bound vehicle arriving at the entrance of the target parking lot and an admission time instant when the bound vehicle passes through the entrance of the target parking lot, wherein the vehicle identifier and the admission time instant are obtained via a license plate automatic recognition by the vehicle detection device arranged at the entrance of the target parking lot; and generating, by the parking management server, the parking service information of the bound vehicle based on the admission time instant when the bound vehicle passes through the entrance of the target parking lot.

4. The parking management method according to claim 1, further comprising:

receiving, by the parking management server, vehicle parking information sent by a vehicle detection device arranged at a parking space in the target parking lot, wherein the vehicle parking information comprises a vehicle identifier of the bound vehicle and a device identifier of the vehicle detection device, wherein the vehicle identifier is obtained via a license plate automatic recognition by the vehicle detection device arranged at the parking space; and determining, by the parking management server, based on a preset correspondence between device identifiers of vehicle detection devices and parking positions in the target parking lot, a parking position corresponding to the device identifier carried in the vehicle parking information, and obtaining parking position information of the bound vehicle.

5. A parking management method, comprising:

determining, by a user terminal, a first location of the user terminal;

automatically initiating, by a user terminal, via scanning a 2D graphic code associated with a parking service, a parking service information request to a parking management server of a target parking lot providing the parking service to cause the parking management server acquire parking service information of a bound vehicle of the user terminal, wherein the parking service information comprises a payment amount corresponding to the parking service rendered to the bound vehicle in the target parking lot and the first location of the user terminal, wherein the parking service information request is sent from a first communication service account of the user terminal registered with a communication service server and a second communication service account of the parking management server registered with the communication service server;

receiving, by the user terminal, parking service information sent by the parking management server; and submitting, by the user terminal, a payment request to a payment server based on the parking service information, to request the payment server to transfer the payment amount from a first payment account of the user terminal to a second payment account of the parking management server;

receiving, by the user terminal, a second location of the bound vehicle, after a predetermined waiting time period following a detection of the second location by vehicle detection devices distributed in the target parking lot;

receiving, by the user terminal, a navigation information generated by the parking management server based on the first location of the user terminal and a second location of the bound vehicle of the user terminal as determined by the parking management server; and displaying, by the user terminal, the navigation information to navigate a user from the first location to the bound vehicle at the second location, receiving, by the parking management server, vehicle departure information sent by a vehicle detection device arranged at an exit of the target parking lot, wherein the vehicle departure information comprises a vehicle identifier of the bound vehicle arriving at the exit of the target parking lot, wherein the vehicle identifier is obtained via a license plate automatic recognition by the vehicle detection device arranged at the exit of the target parking lot; and judging, by the parking management server, whether a data transfer corresponding to the bound vehicle of the user terminal is completed, and instructing, by the parking management server, the exit of the target parking lot to release the bound vehicle in a case that it is determined that the data transfer is completed.

6. A parking management server, comprising one or more processors and a storage medium storing operation instructions, wherein in a case that the operation instructions in the storage medium are run, the processors are configured to:

acquire a parking service information request automatically initiated by a user terminal by scanning a 2D graphic code associated with a parking service and via a first communication service account of the user terminal registered with a communication service server and a second communication service account of the parking management server registered with the communication service server;

acquire parking service information of a bound vehicle of the user terminal, wherein the parking service information comprises a payment amount corresponding to a parking service rendered to the bound vehicle in a target parking lot and a location of the user terminal; and send the parking service information to the user terminal to cause the user terminal to submit a payment request to a payment server based on the parking service information, to request the payment server to transfer the payment amount from a first payment account of the user terminal to a second payment account of the parking management server;

obtain a first location of the user terminal from the parking service information request sent by the user terminal;

determine based on vehicle detection devices distributed in the target parking lot a second location of the bound vehicle of the user terminal within the target parking lot and send the second location to the user terminal via the communication service server after a predetermined waiting time period;

generate a navigation information from the first location to the bound vehicle at the second location;

send the navigation information to the user terminal for display on the user terminal and for navigating the user from the first location to the bound vehicle at the second location;

receive vehicle departure information sent by a vehicle detection device arranged at an exit of the target parking lot, wherein the vehicle departure information comprises a vehicle identifier of the bound vehicle arriving at the exit of the target parking lot, wherein the vehicle identifier is obtained via a license plate automatic recognition by the vehicle detection device arranged at the exit of the target parking lot;

judge whether a data transfer corresponding to the bound vehicle of the user terminal is completed; and instruct the exit of the target parking lot to release the bound vehicle in a case that it is determined that the data transfer is completed.

7. The parking management server according to claim 6, wherein the processors being configured to acquire parking service information of a bound vehicle of the user terminal comprises the processors being configured to:

acquire a vehicle identifier of the bound vehicle of the user terminal carried in the parking service information request, inquire a parking service record of the bound vehicle of the user terminal based on the vehicle identifier, and generate parking service information of the bound vehicle of the user terminal based on the parking service record; or acquire, based on a communication identifier of the user terminal carried in the parking service information, a vehicle identifier bound to the communication identifier of the user terminal, inquire a parking service record of the parking service rendered to the bound vehicle of the user terminal based on the vehicle identifier, and generate parking service information of the bound vehicle of the user terminal based on the parking service record.

8. The parking management server according to claim 6, wherein the processors are further configured to:

receive vehicle admission information sent by a vehicle detection device arranged at an entrance of the target parking lot, wherein the vehicle admission information comprises a vehicle identifier of the bound vehicle arriving at the entrance of the target parking lot and an admission time instant when the bound vehicle passes through the entrance of the target parking lot, wherein the vehicle identifier and the admission time instant are obtained via a license plate automatic recognition by the vehicle detection device arranged at the entrance of the target parking lot; and generating parking service information of the bound vehicle based on the admission time instant when the bound vehicle passes through the entrance of the target parking lot.

9. The parking management server according to claim 6, wherein the processors are further configured to:

receive vehicle parking information sent by a vehicle detection device arranged at a parking space in the target parking lot, wherein the vehicle parking information comprises a vehicle identifier of the bound vehicle and a device identifier of the vehicle detection device, wherein the vehicle identifier is obtained via a license plate automatic recognition by the vehicle detection device arranged at the parking space; and determine, based on a preset correspondence between device identifiers of vehicle detection devices and parking positions in the target parking lot, a parking position corresponding to the device identifier carried in the vehicle parking information, and obtaining parking position information of the bound vehicle.

* * * * *